(12) United States Patent
Chopra et al.

(10) Patent No.: US 10,790,964 B2
(45) Date of Patent: Sep. 29, 2020

(54) PEER VOTING ON A BLOCKCHAIN

(71) Applicant: International Business Machines Corporation, Armonk, NY (US)

(72) Inventors: Anuj Chopra, Singapore (SG); Zhou Yinsheng, Singapore (SG); Yuan Yuan, Singapore (SG); Wenbin Zhang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 15/815,911

(22) Filed: Nov. 17, 2017

(65) Prior Publication Data
US 2019/0158272 A1 May 23, 2019

(51) Int. Cl.
*H04L 9/06* (2006.01)
*H04L 9/30* (2006.01)
*H04L 9/32* (2006.01)

(52) U.S. Cl.
CPC .............. *H04L 9/0637* (2013.01); *H04L 9/30* (2013.01); *H04L 9/3239* (2013.01); *H04L 9/3247* (2013.01); *H04L 2209/38* (2013.01); *H04L 2209/463* (2013.01)

(58) Field of Classification Search
CPC ....... H04L 9/0637; H04L 9/30; H04L 9/3239; H04L 9/3247; H04L 2209/38; H04L 2209/463
See application file for complete search history.

(56) References Cited

U.S. PATENT DOCUMENTS

| 2002/0077887 A1 | 6/2002 | London Shrader et al. |
| 2009/0179071 A1 | 7/2009 | Backert et al. |
| 2017/0109955 A1 | 4/2017 | Ernest et al. |

FOREIGN PATENT DOCUMENTS

WO  2017040313 A1  3/2017

OTHER PUBLICATIONS

Locher et al., Coercion-Resistant Internet Voting with Everlasting Privacy, , in Financial Cryptography and Data Security. Springer-Verlag Berlin An, 2016 (Background).
Trujano, A Cryptographically Secure Voting System for the MIT Community, available from fernandotrujano.com, Date not available (Background).
Osgood, The Future of Democracy: Blockchain Voting, available from Tufts.edu (2016). (Background).
Lakshmikantha et al., Algorithm to Convert Unstructured Data in Hadoop and Framework to Secure Big Data in Cloud, International e-Journal for Technology and Research, vol. 1, Issue 5, May 2017, (Background).
Meter, Christian, Design of Distributed Voting Systems, 24.. arXiv preprint arXiv:1702.02566 (2017). (Related).

*Primary Examiner* — Paul E Callahan

(57) ABSTRACT

An example method of operation may include one or more of identifying one or more votes in a distributed voting configuration, dividing each of the one or more votes into a plurality of partial votes, such that each of the one or more votes comprises two or more partial votes, randomly distributing the plurality of partial votes to a plurality of peer nodes associated with a blockchain, and receiving a broadcast from each of the peer nodes based on a distributed tally of the plurality of partial votes.

20 Claims, 9 Drawing Sheets

PEER VOTING ON A BLOCKCHAIN

TECHNICAL FIELD

This application generally relates to conducting voting procedures, and more particularly, to peer voting on a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Miners may participate in a blockchain block completion/finalization process and be rewarded for processing the block and committing the block to an immutable ledger.

Peer voting, decision making, consensus and other leadership decisions performed on a blockchain may be conducted by certain blockchain members or elected/assigned peer nodes. Peers should always vote fairly, without influence and without an imbalance of voting rights to ensure integrity of any decisions conducted on a blockchain. Peers should operate in a joint agreement to be fair and vote on decisions without taking personal interests ahead of integrity. On an existing blockchain network, voting from the peers of the network is/will be demanded as the ecosystem over the network grows.

One concern is reducing the need to identify a trusted authority. All centralized voting/tally systems have trust concerns. Also because of the nature of blockchain peer voting, the approach should be decentralized without the need for a single trusted authority. In one example, each voter's vote should not be revealed to any one, especially when the total votes are the only votes that matter. Many existing voting systems have the risk of revealing votes at the tally/counting stage. Other attributes to consider are that no one entity should be permitted to change any vote after it is submitted, and no one entity should be able to handle or manage the record of all votes. Another factor to consider is whether any voter can verify whether his/her vote is counted correctly and whether all votes are counted correctly. Dishonest votes, such as double voting, should be detected and excluded from the counting. In addition, due to trust and cost reasons, voting for the peers of a blockchain network should ideally be conducted over an existing blockchain network, rather than appealing to a voting system outside of a blockchain network.

SUMMARY

One example embodiment may provide a method that includes one or more of identifying one or more votes in a distributed voting configuration, dividing each of the one or more votes into a plurality of partial votes, such that each of the one or more votes comprises two or more partial votes, randomly distributing the plurality of partial votes to a plurality of peer nodes associated with a blockchain, and receiving a broadcast from each of the peer nodes based on a distributed tally of the plurality of partial votes.

Another example embodiment may include an apparatus that includes a processor configured to perform one or more of identify one or more votes in a distributed voting configuration, divide each of the one or more votes into a plurality of partial votes, such that each of the one or more votes comprises two or more partial votes, randomly distribute the plurality of partial votes to a plurality of peer nodes associated with a blockchain; and a receiver configured to receive a broadcast from each of the peer nodes based on a distributed tally of the plurality of partial votes.

Still another example embodiment may include a non-transitory computer readable medium configured to store instructions that when executed cause a processor to perform one or more of identifying one or more votes in a distributed voting configuration, dividing each of the one or more votes into a plurality of partial votes, such that each of the one or more votes comprises two or more partial votes, randomly distributing the plurality of partial votes to a plurality of peer nodes associated with a blockchain, and receiving a broadcast from each of the peer nodes based on a distributed tally of the plurality of partial votes.

DETAILED DESCRIPTION

Figure 1A:
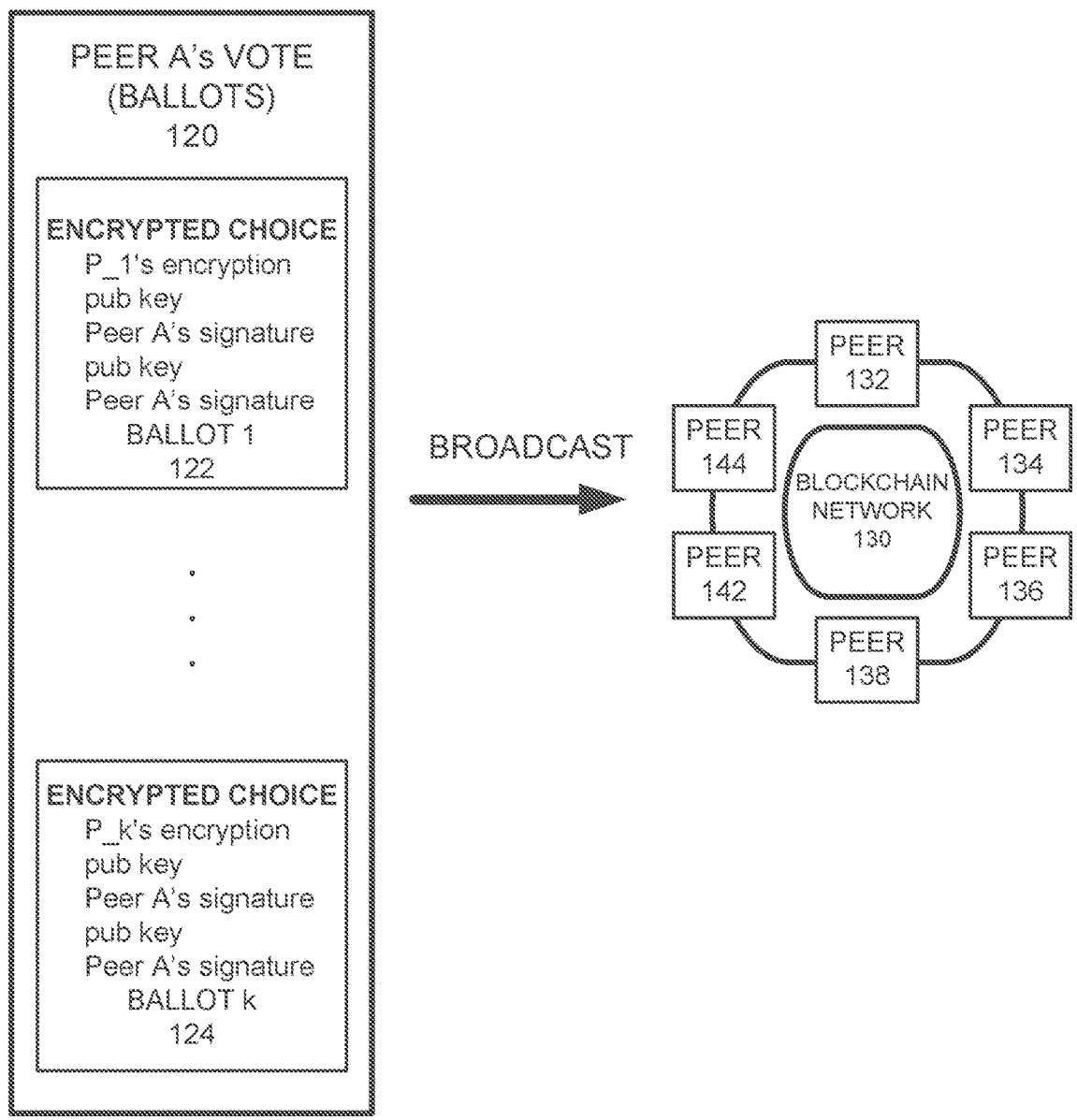
FIG. 1A illustrates a logic diagram of a conducting voting during a voting time window, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment.

Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to conducting voting procedures on a blockchain, and in another embodiment relates to using a fair and integrity based model for peer voting on a blockchain.

According to example embodiments, enabling peers of a blockchain network to vote over an existing blockchain network may be performed by dividing each vote into multiple small parts (i.e., ballots) and distributing them to many randomly selected peers. This approach may enable each part to be verified while a small collection of the votes do not reveal the voter's preferences as each peer counts a small portion of the votes. The counting activity can be verified and corrected so all correct partial counting efforts will be summed together to create one main voting result which can also be verified as a final vote result. By using a digital signature, authenticity of each peer's vote can be determined using homomorphic encryption to protect privacy of votes and to enable counting of encrypted votes for verification purposes. Also, by using detectability plus punishment/reprimand operations may reduce the cheating by peer nodes on the blockchain. In operation, detecting any dishonest votes and/or counting results may result in excluding any dishonest peer's vote and notifications to others so that peer node is accountable to the network for submitting invalid information.

According to example embodiments, one approach is to divide each vote into multiple parts and distribute them to various randomly selected peers of the blockchain, so that each of the vote parts, "partial votes" can be verified and a small collection of them do not reveal the voter's preference, which preserves anonymity. All peers may collaborate on the counting procedure as well to reduce the likelihood of corruption. For example, each peer counts a small portion of the votes, and the counting can be verified and corrected. All correct partial counting will be added up to the main result which can also be verified. Digital signatures are used to assure authenticity of each peer's vote. Homomorphic encryption is used to protect privacy of votes and to enable counting on encrypted votes for verification purpose. Any dishonest vote and/or counting which is detected will result in the dishonest peer's vote being excluded as punishment. Each voter's vote consists of 'k' ballots and can be distributed as ballots for options as each ballot is submitted for one option only, but multiple, for instance, 'k_i' ballots can be provide for option 'i'. Knowing only a small portion of the voter's ballots actually does not disclose his or her vote preference. A common homomorphic encryption scheme, such as the Paillier cryptosystem, may be used, and each peer generates his or her own pair of a public key and a secret key. A common digital signature scheme, such as elliptic curve digital signature algorithm (ECDSA) is used, and each peer generates their own pair of public and secret keys. Each peer is permitted not to vote, but if they would like to vote, they need to vote out all their assigned ballots. A peer will be considered as an honest voter, if each of their ballots is for one option only, and the number of all the ballots is exactly 'k', unless the peer is not voting. A peer will be considered an honest counter, if he or she reports all invalid ballots and counts his portion of the ballots correctly. A peer will be considered as a dishonest peer, if he or she is not an honest voter nor an honest counter, and all such information can be easily verified. Any ballot of an dishonest peer is considered an invalid ballot. The voting result is the correct counting of all valid ballots for each option.

FIG. 1A illustrates a logic diagram of a conducting voting during a voting time window, according to example embodiments. Referring to FIG. 1A, the configuration 100 provides that each peer selects exactly one option for each of his/her ballots B_i, where each option corresponds to a prefixed number so that it can be encrypted. Each peer selects 'k' random peers P_1, . . . , P_k, and encrypts each selection using P_i's public key. The peer records the encrypted choice on the ballot B_i, P_i's public key and the signature public key. Then signs on all the ballots using the signature secret key, and then broadcasts all of the ballots to the blockchain network 130 of peers 132-144. Each peer 132-144 collects all ballots and the network syncs the collection by consensus. In this example, the peer is peer 'A' and the ballots 120 are illustrated as any number of ballots 122-124. The peer may use their own key and signature but the encryption public key is randomly selected among all blockchain peers.

Figure 1B:
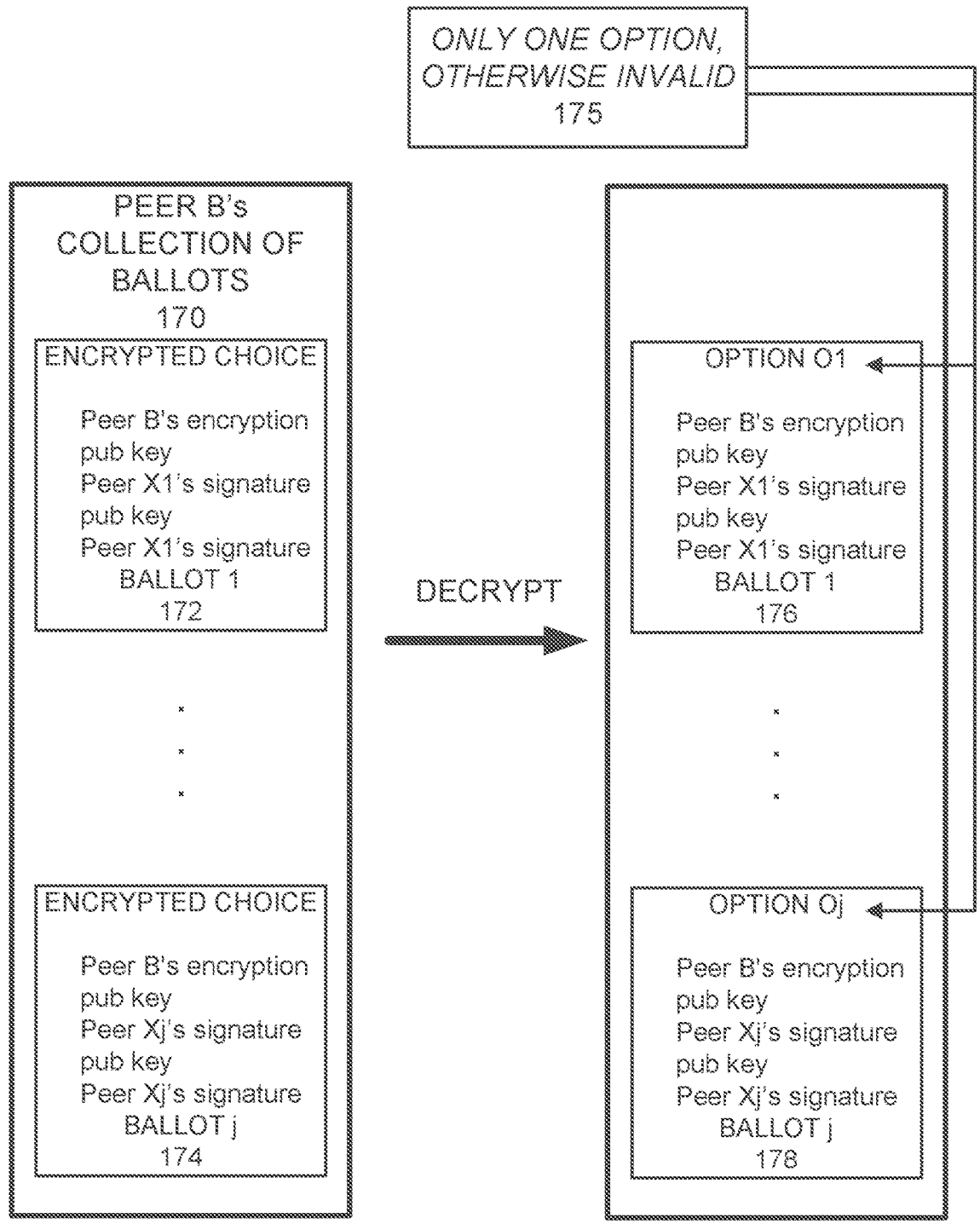
FIG. 1B illustrates a logic diagram of a verifying votes after a voting time window, according to example embodiments.

FIG. 1B illustrates a logic diagram of a verifying votes after a voting time window, according to example embodiments. Referring to FIG. 1B, the configuration 150 provides verifying ballots after a voting time window has lapsed. Each peer may verify whether the number of any peer's ballots is exactly 'k', and broadcasts the list of dishonest voters identified. Each peer collects all peers' lists of dishonest voters, and the network synchronizes the collection to identify a consensus. Each peer decrypts the ballots which are encrypted using a public key and ignores dishonest voters' ballots, verifies if each ballot is valid, and broadcasts the content of invalid ballots and the corresponding voters to other peers. Each peer verifies invalid ballots, and the network synchronizes another collection of dishonest voters by consensus. In this example, peer B may collect all ballots received by personal collection and by broadcast 170. This includes ballots 172 through any number of ballots 174. The decrypted ballots are the ones which are deemed valid 175, such as 176-178. Those ballots encrypted with B's key are only a portion of peer B's collection of all ballots.

Figure 1C:
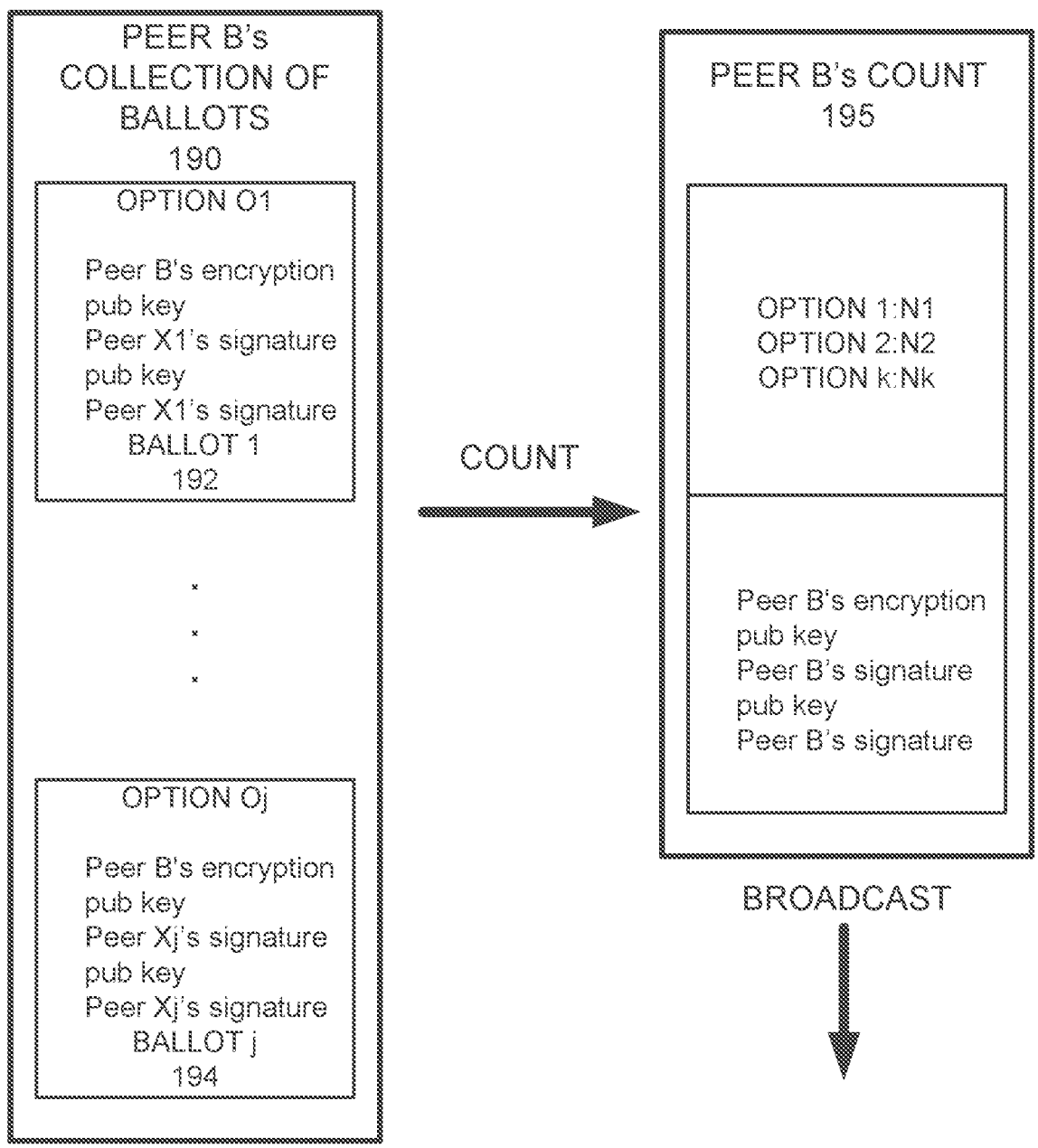
FIG. 1C illustrates a logic diagram of a conducting a partial counting, according to example embodiments.

FIG. 1C illustrates a logic diagram of a conducting a partial counting, according to example embodiments. Referring to FIG. 1C, the configuration 180 provides that for each peer, all valid ballots are counted of their assigned portion of ballots excluding ballots from dishonest voters. For example, peer B's collection of ballots 190 including 192 . . . 194 may be counted according to the rules and broadcast as a count measure without encryption. Each peer collects all other peers' counting results, such as peer B's count 195 and the network synchronizes the results by consensus.

When verifying the counts, each peer verifies any peer's counting result. The determination performed may be whether the counting result is consistent with the number of valid ballots. Also, by using the homomorphic property to tally the encrypted ballots, and encrypting the counting result using the corresponding public key, then it is possible to verify whether both results are equal. Each peer broadcasts his/her list of dishonest peers on a counting operation, and the network synchronizes the collection of dishonest counters by consensus. If no dishonest counter is detected, then the process proceeds to a final counting operation, otherwise dishonest counters' ballots are excluded, and ballots sent to them need to be resent to other peers but the choices cannot be changed. The various operations, of voting, verifying ballots, partial counting and verifying counting, for affected voters and ballots, may be repeated as needed.

The homomorphic encryption scheme used may be the Paillier cryptosystem, which is an additive homomorphic encryption scheme that provides only the public key and the encryption of m1, m2, one can then compute the encryption of m1+m2. A random number 'r' is added in the encryption of a message 'm' so that the encryption of 'm' by different users are not the same.

After all invalid ballots are identified and all counting of valid ballots are verified correct, each peer sums all valid partial counting results together, and broadcasts their identified final counting result. All peers' final counting results are synchronized by the network consensus, and the final result is then confirmed. There is no trusted authority required for this procedure. Each vote is divided into many small parts, such as partial votes or ballots, which are encrypted by a randomly selected peer's public key, and the choice for each ballot is not public in the whole process of voting and counting. This assures that any other peer either does not know of anything of a vote, or only knows one ballot of the process, and a voter's vote won't be revealed, unless most of the 'k' different peers whose public key encrypts the vote collaborate together. This approach is consistent with the consensus nature of a blockchain.

Each ballot cannot be modified as it is encrypted and its encrypted result is published via the blockchain. All ballots and intermediate events are recorded on the blockchain, and thus cannot be changed. Each voter (peer) can verify whether his or her ballots are modified or counted correctly, and whether all valid ballots are counted correctly. This approach permits for detectability of cheating ballots and in turn dishonest voters/dishonest counters. Even if some voters and counters collaborate to cheat, that can also be detected. Detectability permits the blockchain network to punish dishonest peers so that no peer will desire to cheat. The invalid ballots (i.e., ballots of dishonest peers), can be excluded in the counting.

Votes are not revealed since each vote is divided into multiple ballots and each ballot is encrypted using a randomly selected peer's public key. Each ballot of a vote can be viewed by the peer whose public key is used to encrypt that ballot. To reveal a vote, there should be enough peers collaborating together. This is consistent with the consensus nature of blockchain. Each peer counts those ballots encrypted by his or her public key as only that peer can decrypt them. After counting is performed by a peer, that peer needs to publish their partial counting result which will be verified by other peers. Such information may be stored in the blockchain and/or broadcasted to all peers. After confirming correct counting of all portions, the final result can be calculated directly from all the partial vote counting efforts. Any peer has one pair of public and private keys of a homomorphic encryption scheme, and another pair of public and private keys of a digital signature scheme. Each peer randomly selects a peer's public key (encryption) to encrypt one of its own ballots, a different key for a different ballot, and signs each ballot using their own private key (signature). In this way, each ballot is secure in the sense that only one peer can decrypt the information and view its content, and each ballot is signed to ensure authenticity.

Figure 2:
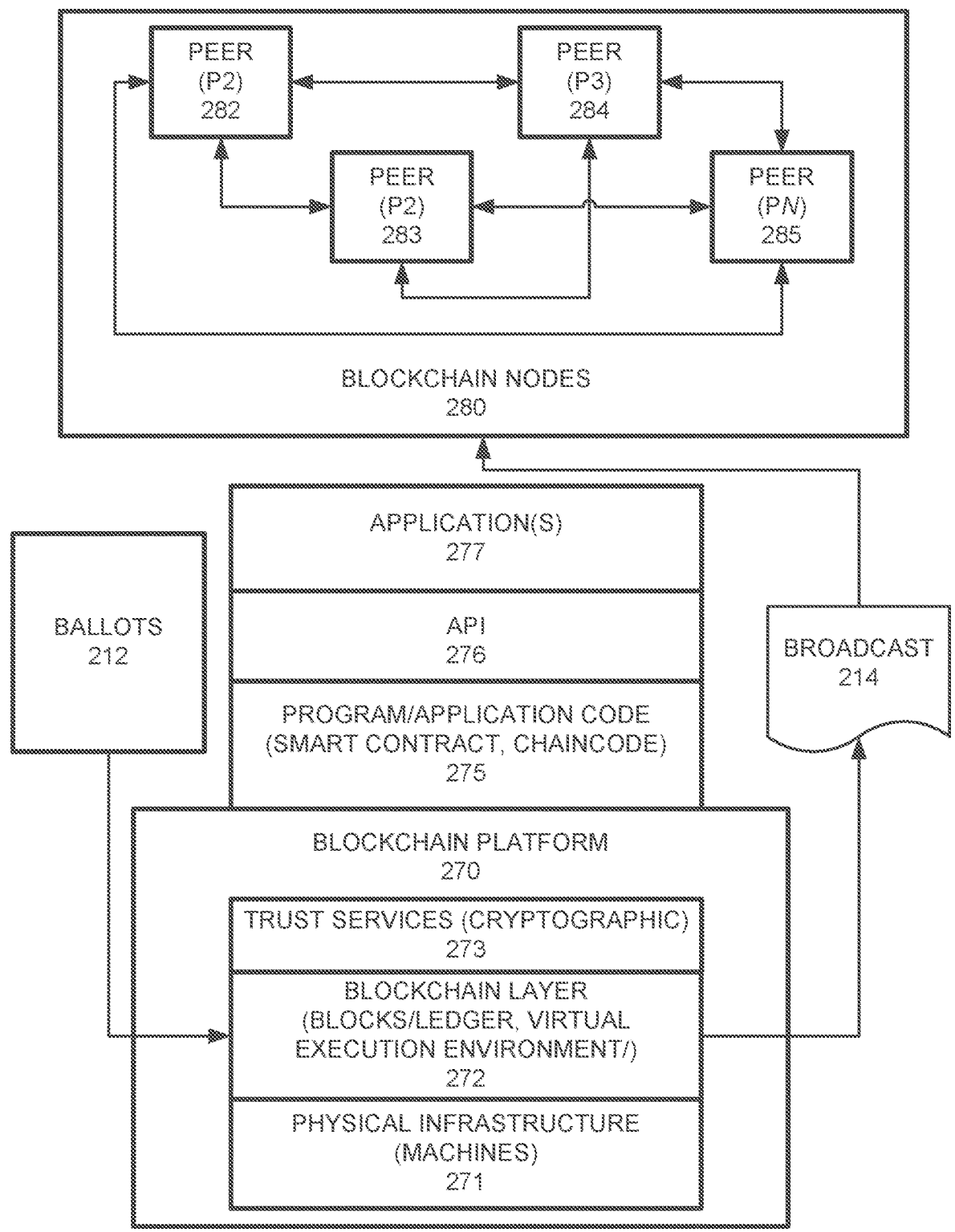
FIG. 2 illustrates an example blockchain configuration for performing voting according to example embodiments.

FIG. 2 illustrates an example blockchain configuration for performing voting, according to example embodiments. Referring to FIG. 2, the blockchain system 200 may include certain common blockchain elements, such as a group of blockchain nodes 280, which may be assigned as peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a smart contract may be identified and approved by the peer nodes 280. The nodes may reach consensus and permit the smart contract to be enacted as a transaction to be committed to the blockchain ledger 272 provided that certain conditions are satisfied. For example, the consensus used by the peer nodes may require a series of initialization operations to be approved by the peers performing the consensus. In this case, the peers may identify ballots 212 checked for authenticity and which have been signed by all necessary parties prior to being enacted on the blockchain. Thereafter, the information is broadcast to all peer nodes 214 for appropriate consensus of the voting procedure. In the event that the results are accurate and all incorrect/invalid/dishonest information is removed, the peer nodes 280 may reach a consensus regarding the results of the vote.

Figure 3:
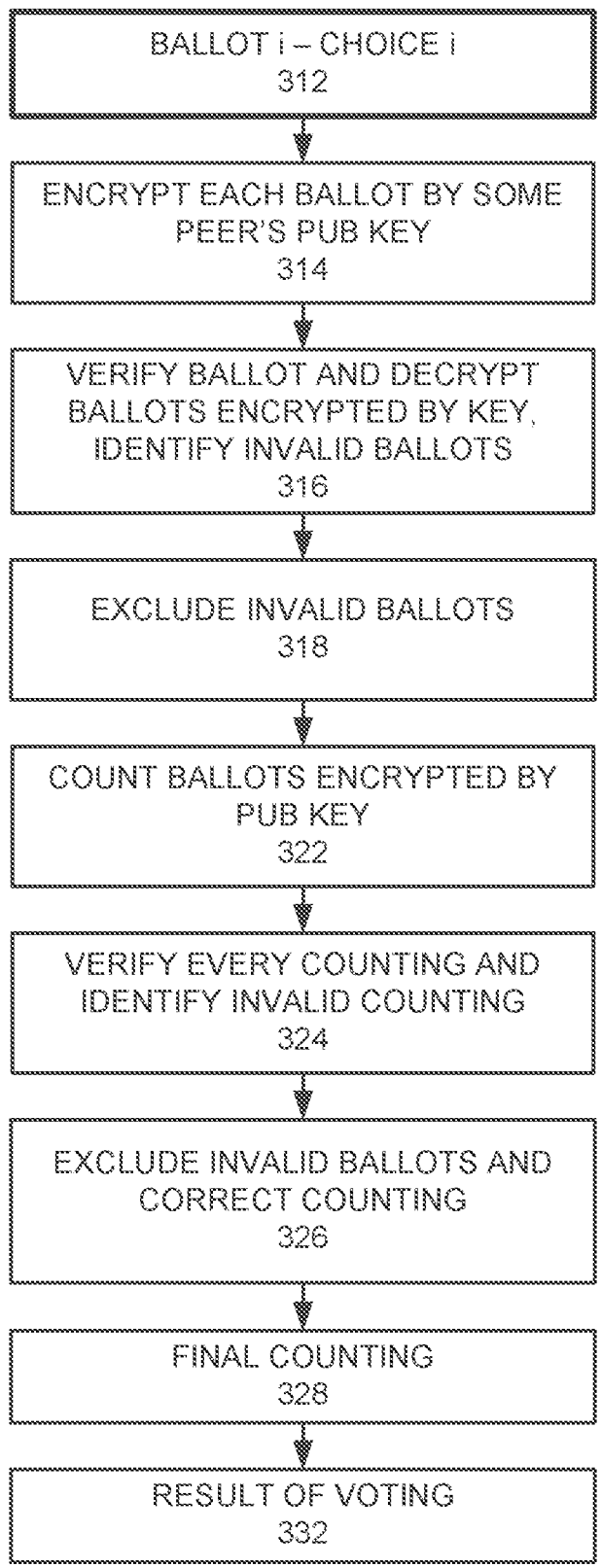
FIG. 3 illustrates a logic diagram flow diagram of a peer performing a collaboration with voting management according to example embodiments.

FIG. 3 illustrates a logic diagram flow diagram of a peer performing a collaboration with voting management according to example embodiments. Referring to FIG. 3, the diagram 300 provides a ballot 'i', which may be peer A's vote or ballot choice 312. The ballot is encrypted by some peer's public key 314, randomly selected or based on another selection algorithm. The ballot is broadcast for updates to the blockchain and other peers. All votes or ballot selections are eventually submitted to all peers. Peer A may then verify a ballot and decrypt ballots encrypted by a key and determine which are invalid 316 and exclude those ballots 318. The ballots are counted and encrypted by the peer's own public key 322. All countings must be performed for all partial countings received for confirmation and to identify invalid counting information 324. The invalid ballots and correct counting information is updated 326 and broadcast. The final counting 328 can then be performed to determine an accurate result 332.

Figure 4:
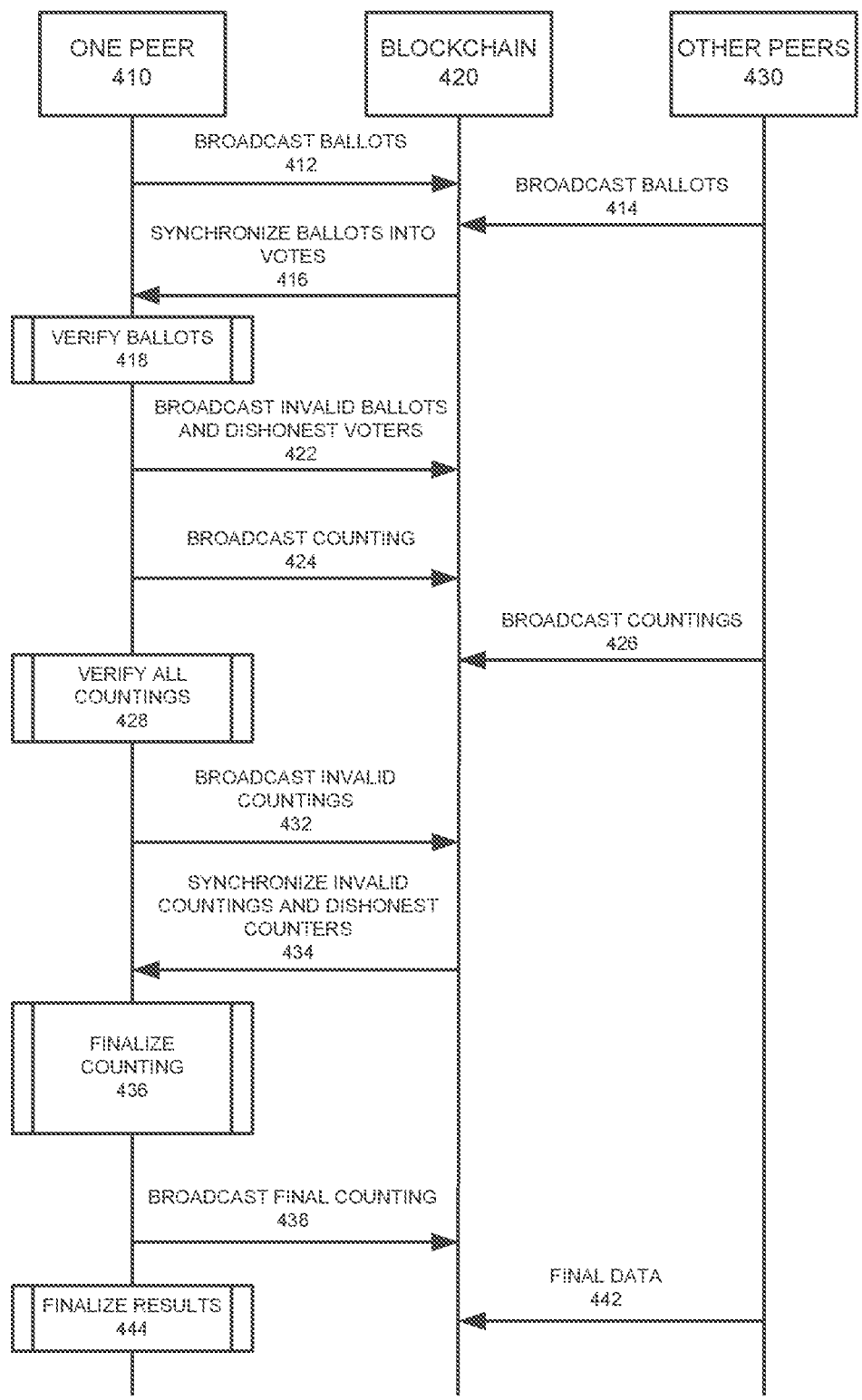
FIG. 4 illustrates a system signaling diagram for performing a voting procedure according to example embodiments.

FIG. 4 illustrates a system signaling diagram for performing a voting procedure according to example embodiments. Referring to FIG. 4, the system diagram 400 includes an operating or example peer 410, the blockchain 420 and other peers 430 illustrates to demonstrate the perspective of a single peer during the voting and finalization procedure. In operation, the peer's ballots are cast/broadcast 412 to other peers and the blockchain 420. The other peers may broadcast their own ballots 414 as well to be shared with others. The peer 410 may receive all the broadcast ballots 416 and synchronize the information. The ballots may be verified 418 and all invalid ballots and dishonest voters 422 may be shared with the blockchain network. Once the invalid information is identified, the partial counting may be shared with others 424. The other peers may also share such information 426 for access to others. The countings may then be performed to identify/verify 428 a counting of accurate information regarding ballots, which the invalid counting information is then shared 432 and updated counting information from others is also received 434. Now, since the accurate data is available, a final counting 436 may be attempted to determine the accurate information for the voting. The final result is broadcast 438 from all parties 442 and the final result can be determined 444 and recorded on the blockchain 420.

Figure 5A:
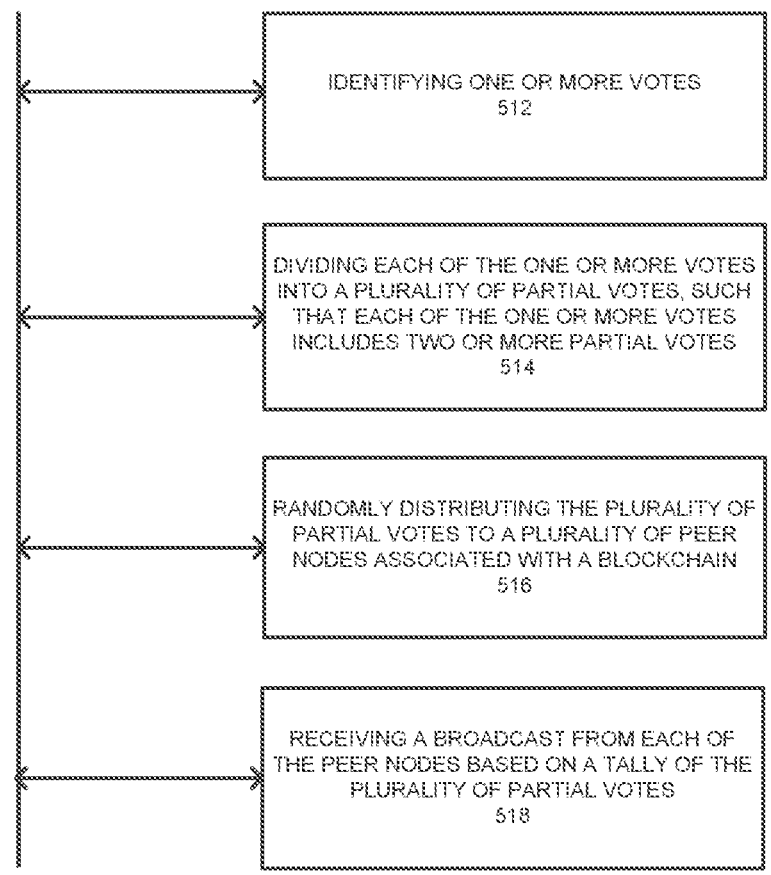
FIG. 5A illustrates an example flow diagram of performing a voting operation, according to example embodiments.

FIG. 5A illustrates an example flow diagram of performing a voting operation, according to example embodiments. Referring to FIG. 5A, the example method 500 may provide identifying one or more votes in a distributed voting configuration 512, dividing each of the one or more votes into a plurality of partial votes, such that each of the one or more votes comprises two or more partial votes 514. The votes/ballots may be randomly distributed to a plurality of peer nodes associated with a blockchain 516, and a broadcast from each of the peer nodes based on a distributed tally of the plurality of partial votes can be received by the initiating node 518. The method may also include receiving a plurality of partial counts from the respective plurality of peer nodes, the plurality of partial counts each comprise a distributed tally of a portion of the plurality of partial votes, checking the plurality of partial counts for errors and correcting any identified errors, summing the plurality of partial counts, and verifying the sum of the plurality of partial counts is valid. The method may also include verifying the sum of the plurality of partial counts by identifying a number of the plurality of partial votes is incorrect, and responsive to identifying the number of the plurality of partial votes is incorrect, discarding any excess partial votes as invalid partial votes beyond a correct number of the plurality of partial votes, and broadcasting the invalid partial votes to the one or more peer nodes responsible for the excess partial votes. The method may also include performing a final count of the partial votes after the excess partial votes are discarded, and determining a vote result based on the final count of the partial votes, encrypting the plurality of partial votes based on a randomly selected public key associated with one of the plurality of peer nodes, and storing the encrypted plurality of partial votes on the blockchain. When none of the plurality of peer nodes are identified as being dishonest, a final count of all of the received plurality of partial votes may be performed.

Figure 5B:
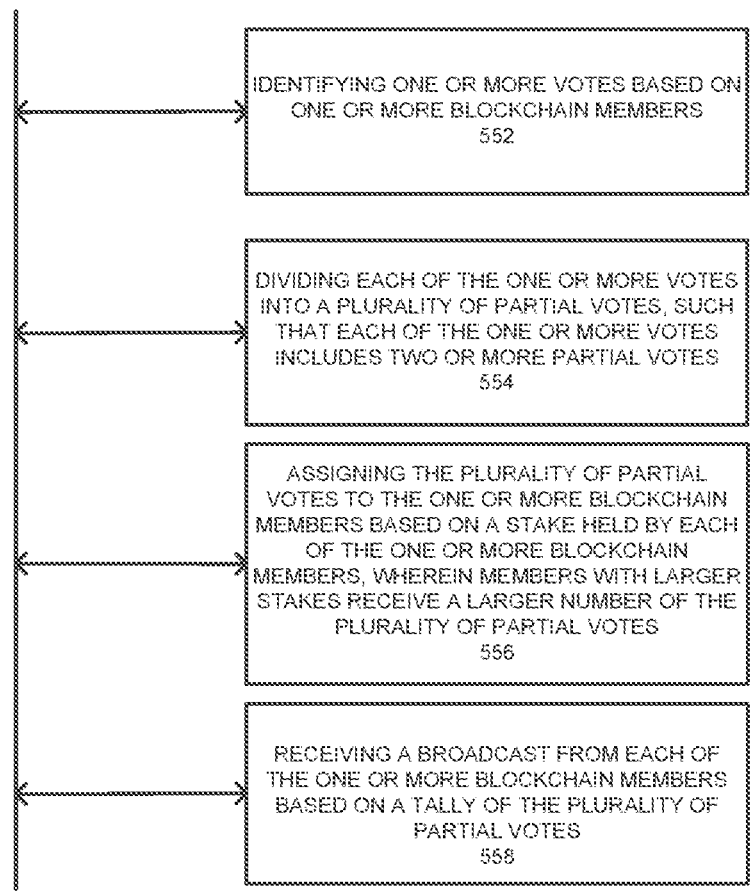
FIG. 5B illustrates another example flow diagram of performing a voting operation, according to example embodiments.

FIG. 5B illustrates another example flow diagram of performing a voting operation, according to example embodiments. The method 550 may provide identifying one or more votes based on one or more blockchain members 552, dividing each of the one or more votes into a plurality of partial votes, such that each of the one or more votes comprises two or more partial votes 554, assigning the plurality of partial votes to the one or more blockchain members based on a stake held by each of the one or more blockchain members, wherein members with larger stakes receive a larger number of the plurality of partial votes 556, and receiving a broadcast from each of the one or more blockchain members based on a tally of the plurality of partial votes 558.

In another example embodiment, the different members of a blockchain may have a larger stake or exposure to the blockchain transactions (i.e., transactions initiated, ownership, consensus decisions, membership roles, etc.) than other members. As a result, the members having such larger stakes are identified by a label and/or a weight that identifies the member's relative worth within that particular blockchain. For example, an organization may represent half of the members of the blockchain and perform half of the transactions, etc., while the other four or five organizations collectively only represent the other half of the blockchain. In such a case, one or more leaders of the primary organization may have a higher relative weight or status than other blockchain members. In this example, those higher stake having members may be assigned a larger number of the partial votes to equal the imbalance between their stake and the other members' stakes. The stake may be identified by an integer or other numerical value.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
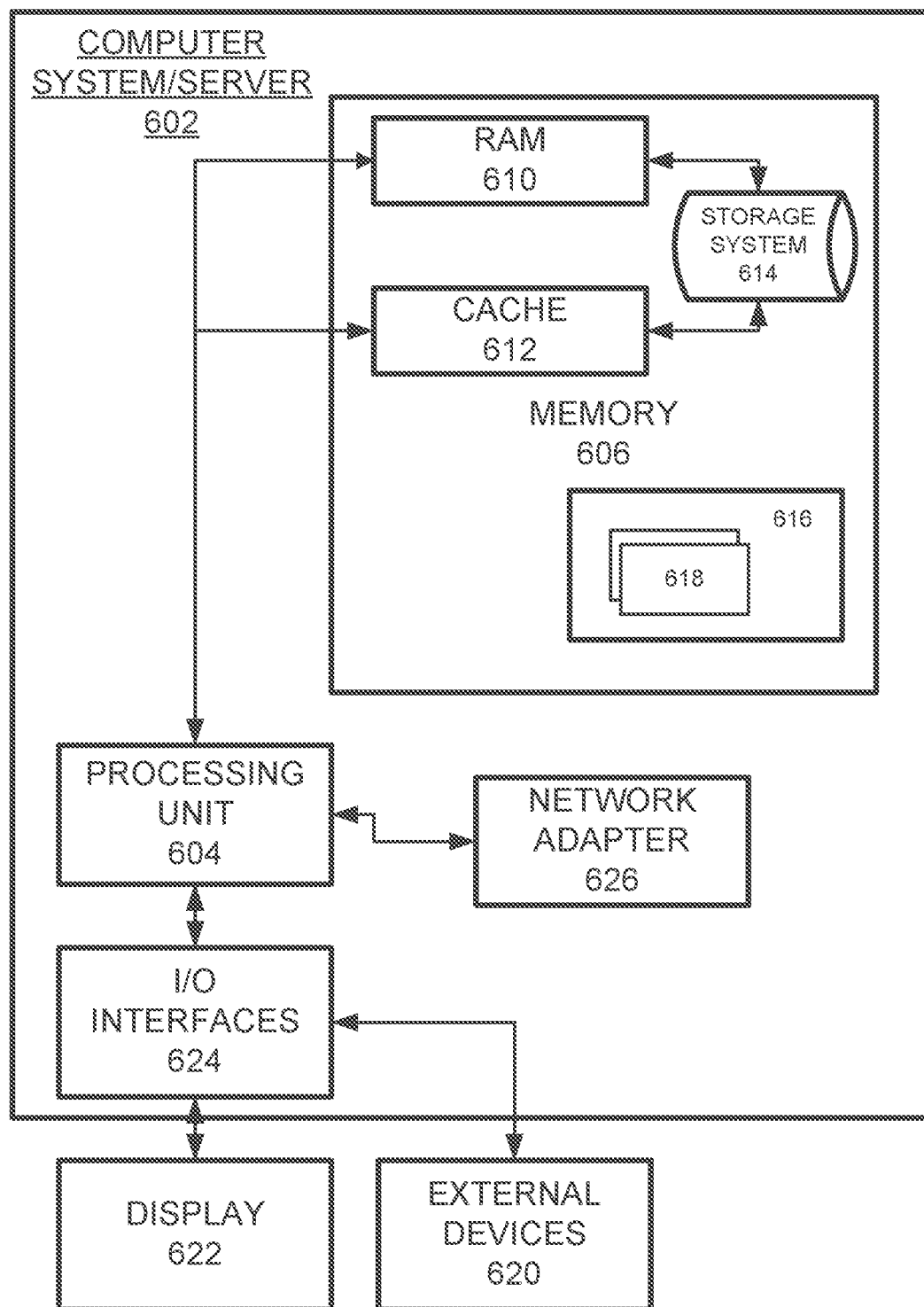
FIG. 6 illustrates an example computer system/server configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying one or more votes in a distributed voting configuration;
   dividing each of the one or more votes into a plurality of partial votes, such that each of the one or more votes comprises two or more partial votes;
   randomly distributing the plurality of partial votes to a plurality of peer nodes associated with a blockchain; and
   receiving a broadcast from each of the peer nodes based on a distributed tally of the plurality of partial votes.

2. The method of claim 1, further comprising:
   receiving a plurality of partial counts from the respective plurality of peer nodes, wherein the plurality of partial counts each comprise a distributed tally of a portion of the plurality of partial votes;
   checking the plurality of partial counts for errors and correcting any identified errors; and
   summing the plurality of partial counts; and
   verifying the sum of the plurality of partial counts is valid.

3. The method of claim 2, wherein verifying the sum of the plurality of partial counts is valid comprises
   identifying a number of the plurality of partial votes is incorrect; and responsive to identifying the number of the plurality of partial votes is incorrect,
   discarding any excess partial votes as invalid partial votes beyond a correct number of the plurality of partial votes; and
   broadcasting the invalid partial votes to the one or more peer nodes responsible for the excess partial votes.

4. The method of claim 3, further comprising:
   performing a final count of the partial votes after the excess partial votes are discarded; and
   determining a vote result based on the final count of the partial votes.

5. The method of claim 1, further comprising:
   encrypting the plurality of partial votes based on a randomly selected public key associated with one of the plurality of peer nodes.

6. The method of claim 1, further comprising:
   storing the encrypted plurality of partial votes on the blockchain.

7. The method of claim 1, further comprising:
   when none of the plurality of peer nodes are identified as being dishonest, performing a final count of all the received plurality of partial votes.

8. An apparatus, comprising:
   a storage medium configured to store instructions; and
   a hardware processor configured to execute the instructions to:
      identify one or more votes in a distributed voting configuration;
      divide each of the one or more votes into a plurality of partial votes, such that each of the one or more votes comprises two or more partial votes;

randomly distribute the plurality of partial votes to a plurality of peer nodes associated with a blockchain; and a receiver configured to receive a broadcast from each of the peer nodes based on a distributed tally of the plurality of partial votes.

9. The apparatus of claim 8, wherein the receiver is further configured to receive a plurality of partial counts from the respective plurality of peer nodes, wherein the plurality of partial counts each comprise a distributed tally of a portion of the plurality of partial votes; and wherein the processor is further configured to:

check the plurality of partial counts for errors and correct any identified errors;
sum the plurality of partial counts; and
verify the sum of the plurality of partial counts is valid.

10. The apparatus of claim 9, wherein to verify the sum of the plurality of partial counts is valid comprises the processor being configured to:

identify a number of the plurality of partial votes is incorrect;
responsive to the number of the plurality of partial votes being identified as incorrect, discard any excess partial votes as invalid partial votes beyond a correct number of the plurality of partial votes; and
broadcast the invalid partial votes to the one or more peer nodes responsible for the excess partial votes.

11. The apparatus of claim 10, wherein the processor is further configured to:

perform a final count of the partial votes after the excess partial votes are discarded; and
determine a vote result based on the final count of the partial votes.

12. The apparatus of claim 8, wherein the processor is further configured to:

encrypt the plurality of partial votes based on a randomly selected public key associated with one of the plurality of peer nodes.

13. The apparatus of claim 8, wherein the processor is further configured to:

store the encrypted plurality of partial votes on the blockchain.

14. The apparatus of claim 8, wherein the processor is further configured to:

when none of the plurality of peer nodes are identified as being dishonest, perform a final count of all the received plurality of partial votes.

15. A non-transitory computer readable medium configured to store instructions that when executed cause a processor to perform:

identifying one or more votes in a distributed voting configuration;
dividing each of the one or more votes into a plurality of partial votes, such that each of the one or more votes comprises two or more partial votes;
randomly distributing the plurality of partial votes to a plurality of peer nodes associated with a blockchain; and
receiving a broadcast from each of the peer nodes based on a distributed tally of the plurality of partial votes.

16. The non-transitory computer readable medium of claim 15, wherein the processor is further configured to perform:

receiving a plurality of partial counts from the respective plurality of peer nodes, wherein the plurality of partial counts each comprise a distributed tally of a portion of the plurality of partial votes;
checking the plurality of partial counts for errors and correcting any identified errors; and
summing the plurality of partial counts; and
verifying the sum of the plurality of partial counts is valid.

17. The non-transitory computer readable medium of claim 16, wherein verifying the sum of the plurality of partial counts is valid comprises identifying a number of the plurality of partial votes is incorrect; and
responsive to identifying the number of the plurality of partial votes is incorrect, discarding any excess partial votes as invalid partial votes beyond a correct number of the plurality of partial votes; and
broadcasting the invalid partial votes to the one or more peer nodes responsible for the excess partial votes.

18. The non-transitory computer readable medium of claim 17, wherein the processor is further configured to perform:

performing a final count of the partial votes after the excess partial votes are discarded; and
determining a vote result based on the final count of the partial votes.

19. The non-transitory computer readable medium of claim 15, wherein the processor is further configured to perform:

encrypting the plurality of partial votes based on a randomly selected public key associated with one of the plurality of peer nodes.

20. The non-transitory computer readable medium of claim 15, wherein the processor is further configured to perform:

storing the encrypted plurality of partial votes on the blockchain;
when none of the plurality of peer nodes are identified as being dishonest, performing a final count of all the received plurality of partial votes.

* * * * *